United States Patent [19]

Moss et al.

[11] 3,878,247

[45] Apr. 15, 1975

[54] PREPARATION OF N-(TERTIARYAMINOALKYL) ACRYLAMIDES

[75] Inventors: Philip Hotchkiss Moss; Robert Malone Gipson, both of Austin, Tex.

[73] Assignee: Jefferson Chemical Company, Inc., Houston, Tex.

[22] Filed: Jan. 25, 1974

[21] Appl. No.: 436,467

[52] U.S. Cl.. 260/561 N; 260/247.2 A; 260/293.88; 260/326.43
[51] Int. Cl............................................ C07c 103/64
[58] Field of Search..... 260/561 N, 561 R, 247.2 A, 260/293.88, 326.43

[56] References Cited
UNITED STATES PATENTS

| | | | |
|---|---|---|---|
| 2,451,436 | 10/1948 | Erickson | 260/561 N |
| 2,529,838 | 11/1950 | Erickson | 260/561 N |
| 3,652,671 | 3/1972 | Barron | 260/561 N |

OTHER PUBLICATIONS

Erickson, J.A.C.S. 74, 6281–6282, (1952).

*Primary Examiner*—C. Davis
*Attorney, Agent, or Firm*—James L. Bailey; John R. Kirk, Jr.; Terrence Dean Dreyer

[57] ABSTRACT

A noncatalytic process for the preparation of N-(tertiaryaminoalkyl)acrylamides is disclosed which comprises subjecting a corresponding $\beta$-aminopropionamide to a temperature of about 180°–300°C. and separating the N-tertiaryaminoalkyl) acrylamide from the reaction product. The corresponding $\beta$-aminopropionamide compounds can be prepared by mixing and reacting at least 2 moles of a tertiaryaminoalkyl amine with an acrylic acid or ester compound. The inventive process provides the production of the N-(tertiaryaminoalkyl)acrylamides in high yields with minimal back-addition or polymerization.

8 Claims, No Drawings

PREPARATION OF N-(TERTIARYAMINOALKYL) ACRYLAMIDES

BACKGROUND OF THE INVENTION

The present invention relates to a chemical process for making useful cationic vinyl monomers and more particularly pertains to an improved noncatalytic process for the preparation of N-(tertiaryaminoalkyl)acrylamides. The products of this invention are useful in preparing flocculants, adhesion promoters, oil soluble dispersants, epoxy curing agents and ion exchange resins.

DESCRIPTION OF THE PRIOR ART

It is well-known that certain β-aminopropionamide compounds can be made by reacting dialkylamine compounds with an acrylic acid or ester compound, as described in John G. Erickson's article, "The Preparation and Stabilities of Some β-Dialkylaminopropionamides" J.Am.Chem.Soc. 74, 6281–82 (1952). The reference discloses that N,N-dialkyl-β-dialkylaminopropionamides decompose, when heated at temperatures of about 125°–215°C., to corresponding dialkylamines and N,N-dialkylacrylamides and the ease of such decomposition decreases from dibutylamine to dimethylamine derivatives. The observation of extensive polymerization of product substituted acrylamide when certain of the β-dialkylaminopropionamides are heated is also described.

U.S. Pat. No. 2,451,436 to John G. Erickson teaches that N-alkyl acrylamides can be prepared by subjecting an N-alkyl β-alkylaminopropionamide, prepared by reacting 2 moles of an alkylamine or dialkylamine with an ester of acrylic or methacrylic acid, to elevated temperatures in the presence of a strong acid catalyst. The patent discloses that the acid catalytic process results in the formation of the salt of the aminoamide which splits when heated into the alkyl amine salt and the N-alkylated acrylamide, the latter distilling off during heating.

U.S. Pat. No. 2,529,838 to John G. Erickson teaches that certain N,N-dialkyl acrylamides are produced by heating a dialkylamine containing at least 5 carbon atoms per alkyl group with a monomeric acylic ester under superatmospheric pressure at temperatures between about 150°–400°C. The reference further teaches that dialkylamines containing fewer than 5 carbon atoms per alkyl group cannot be employed in the disclosed process.

However, these prior art process have been found to be disadvantageous for the preparation of certain N-(aminoalkyl) acrylamide compounds inasmuch as they typically produce tarry or gummy reaction mixtures from which it is difficult to separate a good yield of pure product. For example, the employment of the acid catalytic process described in U.S. Pat. No. 2,451,436 results in the product of alkylamino alkylacrylamides in salt form which are not volatile and, hence, cannot be readily recovered by distillation separation procedures. Moreover, the process described in U.S. Pat. No. 2,529,838 requires very high temperatures and superatmospheric pressures wherein the reactions are of a very long duration.

In a view of these disadvantages, the above-described processes have been considered inapplicable for the preparation of N-(tertiarylaminoalkyl)acrylamides and several alternative processes have been described. For example, U.S. Pat. No. 2,649,438 to Bruson, teaches that certain N-(tertiaryaminoalkyl) acrylamides can be prepared by reacting β-propionlactone,

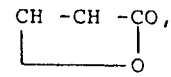

with the desired tertiary amino diamine and distilling the reaction product under reduced pressure whereby dehydration readily occurs. The patent further teaches that other N-(tertiaryaminoalkyl)acrylamides can be obtained by reacting the appropriate acrylyl chloride with the desired tertiary amino diamine.

U.S. Pat. No 3,652,671 to Barron describes a process for preparing N-(dialkylaminoalkyl)methacrylamides wherein the Michael adduct of methacrylic acid and an N,N-dialkylalkylenediamine, that is, the N-(dialkylaminoalkyl)-2-methyl-β-alanine, is subjected to an elevated temperature of about 140°–230°C. which results in substantially complete rearrangement to the N-(dialkylaminoalkyl)methacrylamide product. Although this process appears to be an improvement over other prior art processes described hereinabove, it has the disadvantage of being applicable only to the preparation of N-(dialkylaminoalkyl) methacrylamides which are obtained from methacrylic acid adducts. The patentee teaches that the use of corresponding adducts of acrylic acid in the described process gives poor results with side reactions predominating. The reaction mixtures produced by heating these adducts are stated to be largely by-products and tarry materials from which only small quantities of the desired acrylamide can be separated.

Surprisingly, we have discovered a process for preparing N-(tertiaryaminoalkyl)acrylamides by thermal decomposition of the corresponding β-aminopropionamides in the absence of catalyst or utilization of excessive elevated temperatures in substantially high yields and which can be readily separated as relatively pure products. The result of the inventive process was most unexpected inasmuch as N-(tertiaryaminoalkyl)acrylamides are more susceptible to polymerization than N,N-dialkylacrylamides. Moreover, the results of the inventive process were surprising for tertiaryaminoalkyl amines having a primary amine group tend to add more rapidly with the acrylic acid or ester carbon-carbon double bonds than do secondary dialkylamines. The reversal of the addition would then be expected to take place with more reluctance with the primary amines. Most unexpectedly, such is not the case in the practice of the present invention. The high yields of relatively pure, stable product were also unexpected since primary amines normally add back faster than secondary amines to form the corresponding β-aminopropionamide starting materials.

SUMMARY OF THE INVENTION

The present invention is an improved noncatalytic process for the preparation of N-(tertiaryaminoalkyl)acrylamides of the formula

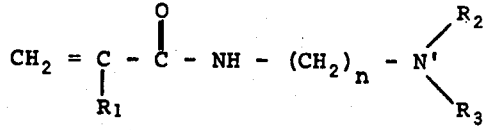

wherein $R_1$ is H or methyl; $n$ is an integer from 2 to 6; and $R_2$ and $R_3$, taken singly are lower alkyl groups containing 1 to 4 carbon atoms; or $R_2$ and $R_3$, taken jointly are combined with the N' atom to form a heterocyclic group selected from the group consisting of morpholine, pyrollidine or piperidine ring groups which comprises subjecting a β-aminopropionamide of the formula

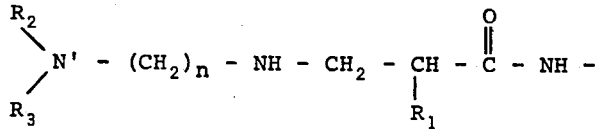 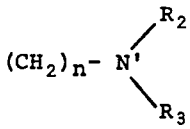

wherein $R_1$, $R_2$, $R_3$ and $n$ are the same as above, to a temperature of about 180°C. to about 300°C. in the absence of a catalyst. The resultant product N-(tertiaryaminoalkyl)acrylamide compound is then separated in high yields in a substantially pure form. The β-aminopropionamide is preferably prepared by mixing and reacting at least 2 moles of a tertiaryaminoalkyl amine of the formula

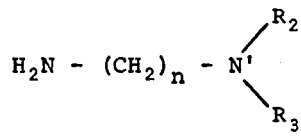

wherein $n$ is an integer from 2 to 6, $R_2$ and $R_3$, taken singly are lower alkyl groups containing 1 to 4 carbon atoms, or $R_2$ and $R_3$, taken jointly are combined with the N' atom to form a heterocyclic group selected from the group consisting of morpholine, pyrollidine or piperidine ring groups, with an acrylic acid or ester compound of the formula

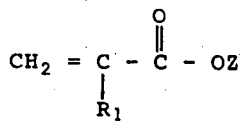

wherein $R_1$ is H or methyl and Z is H or an alkyl group containing 1 to 2 carbon atoms, at a temperature within the range of about 1°C to about 200°C. for a time period sufficient to form the corresponding β-aminopropionamide compound. The inventive process provides the production of substantially high yields of the corresponding N-(tertiaryaminoalkyl)acrylamides with little, if any, back addition to the β-aminopropionamide or of the production of tarry or gummy residues. Moreover, the resultant product N-(tertiaryaminoalkyl)acrylamide compound is readily separated from both the β-aminopropionamide reaction mixture and the tertiaryaminoalkyl amine thus formed by conventional separating procedures such as distillation and condensation.

DETAILED DESCRIPTION

The inventive process can be carried out batchwise or in a substantially unitary continuous procedure, which is preferred. Thus, in accordance with the preferred embodiment of the invention, at least 2 moles of the desired tertiaryaminoalkyl amine are combined with the desired acrylic acid or ester compound and the mixture is heated at a temperature within the range of about 100°C. to about 200°C. for a time period sufficient to produce the corresponding β-aminopropionamide reaction product. Preferably, an excess of 2 moles of the desired tertiaryaminoalkyl amine is employed to insure maximum formation of the corresponding β-aminopropionamide product. There is no criticality in the maximum amount of amine compound employed other than practical considerations of subsequent excess unreacted amine removal from the reaction mixture. Normally, the reaction product is formed within a time period of about 0.5 to 10 hours, depending upon the particular starting materials employed and temperatures employed. The corresponding β-aminopropionamide reaction product can then be separated from the reaction mixture, which also contains water or alcohol of reaction and excess unreacted amine compound, if desired, by conventional distillation procedures. However, the inventive process is equally applicable to the continuous use of the entire reaction mixture, for the water or alcohol of reaction and excess unreacted amine do not adversely affect the process.

Tertiaryaminoalkyl amines which are especially useful in the practice of the present invention include: 3-dimethyl-aminopropylamine; 2-dibutylaminoethylamine; 4-(aminopropyl) morpholine; 3-diethylaminopropylamine; 2-dimethylaminoethylamine; 1-(aminopropyl)piperidine; and 4-(aminoethyl)-morpholine. Optimum high yields have been obtained employing 3-dimethylaminopropylamine and 4-(aminopropyl)morpholine.

Particular acrylic acid or ester compounds useful in the invention include: acrylic acid; methacrylic acid; methyl acrylate; methyl methacrylate; ethyl acrylate; and ethyl methacrylate. Methyl acrylate and methyl methacrylate are preferred.

The above-described β-aminopropionamide is then heated to temperatures within the range of about 180°-300°C. where the desired corresponding N-(tertiaryaminoalkyl)acrylamide is volatile. The product amide and cleaved tertiaryaminoalkyl amine are thus taken overhead as they are formed. The preferred temperatures employed are, of course, dependent upon the boiling point of each particular β-aminopropionamide utilized which has been derived from the corresponding tertiaryaminoalkyl amine and acrylic acid or ester compound. The particular temperatures for each particular β-aminopropionamide and corresponding product amide and cleaved tertiaryaminoalkyl amine can be readily ascertained by those having ordinary skill in the art with only minor experimentation or study. For example, in experiments employing the β-aminopropionamide reaction product of 3-dimethylaminopropylamine and methyl methacrylate, we have found that overall optimum results are obtained by heating the reaction product mixture to within the range of about 210°-250°C.

The inventive process may be carried out at either reduced pressure or low superatmospheric pressure without affecting the desired results. The particular pressure employed is not critical and is dependent upon the particular starting materials and temperature employed as well as the ratio of components in the reaction mixture, e.g., the inclusion of alcohol or water of reaction and/or unreacted amine with the β-aminopropionamide reaction product. Higher pressures are generally employed with higher temperatures.

Preferably, the heating is carried out in a continuous process employing reduced pressures within the range of about 2 mm.–760 mm. or superatmospheric pressures up to about 150 psig. Reduced pressures within the range of about 2 mm.–500 mm. are optimum in continuous processing. Batch reactions are preferably carried out at low superatmospheric pressures within the range of about 10 to 85 psig.

Experiments have shown that, by subjecting β-aminopropionamides to temperatures within the above-described ranges results in the formation of the corresponding desired N-(tertiaryaminoalkyl)acrylamide products in substantially high yields with little, if any, polymerization of the reaction mixture with little regeneration of the β-aminopropionamides. The desired N-(tertiaryaminoalkyl)acrylamide and cleaved tertiaryaminoalkyl amine resulting from the thermal decomposition can then be easily separated by conventional separation processes, such as fractional distillation, which are well-known to the skilled artisan. Accordingly, any conventional separation and/or distillation apparatus can be employed. It is possible, if desired, to selectively condense the product N-(tertiaryaminoalkyl) acrylamide from the vapors of the reaction mixture and obtain the product amide in a substantially pure form. This can be effectively done when the boiling points of the product amide and corresponding starting diamine at the pressure of reaction are known to differ sufficiently to permit selective condensation.

Although it is not essential, it is preferred that the β-aminopropionamide be subjected to the heating step in the presence of a polymerization inhibitor so as to reduce or prevent vinyl polymerization. Polymerization inhibitors useful in the process include hydroquinone, p-methoxyphenol, 2,6-di-t-butyl-p-cresol, N-phenyl-2-naphthylamine, N,N-diephenyl-p-phenylenediamine, 2-mercaptobenzothiazole, or copper powder.

The inventive process is especially applicable to the continuous preparation of N-dimethylaminopropyl acrylamide compounds in high yields, based upon the amount of 3-dimethylaminopropylamine and acrylic compound starting materials. Thus, in accordance with a preferred embodiment of the invention, 3-dimethylaminopropylamine and the acrylic acid or ester compound are continuously mixed and reacted at an elevated temperature in a mole ratio of at least 2:1, as described hereinbefore, and the reaction mixture is subjected to a temperature of about 210°–250°C. and a reduced pressure of about 15 mm.–75 mm. The desired reaction product, N-dimethylaminopropyl methacrylamide, is then continuously collected by distillation in high yields with little, if any, back-additon or polymerization. The process may be carried out continuously in a single reaction zone employing controlled temperatures and pressures or, as mentioned hereinbefore, the water or alcohol of reaction and excess dimethylaminopropylamine may be removed from the β-aminopropionamide reaction product as it is formed. Morever, excess unreacted dimethylaminopropylamine and the uncracked corresponding β-aminopropionamide can be recycled by known procedures to the respective reactions for improved efficiency.

The following Examples are for purposes of illustration of our invention and are not intended to be limiting thereof.

EXAMPLE I

To a 1-liter, 3-necked, round-bottomed flask, equipped with stirrer, thermometer, short column. K-head, was charged 200 g. (2.0 moles) of methyl methacrylate and 460 g. (4.5 moles) of 3-dimethylaminopropylamine. After heating 16 hours at 97°–99°C., the solution was brought to 130°C. and then gradually to 156°C. over 7 hours. During this last period, 43 g. of distillate, primary methanol of reaction, was collected at a head temperature of 67°–77°C. The reaction mixture was stripped free of excess dimethylaminopropylamine at a maximum, final temperature of 124°C. and under vacuum gradually reduced to 2 mm. 472 g. of the reaction product was obtained which was determined by analysis to be

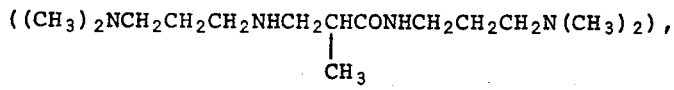

% nitrogen by Kjeldahl 19.4% (theory 20.6%).

A mixture of 75 g. of the dimethylaminopropylaminemethyl methacrylate reaction product plus 2 g. of copper powder to inhibit polymerization was then added to a 250 ml. round-bottomed flask, stirred by a magnetic bar and equipped with a thermometer and a simple take-off leading to an ice-cooled receiver, and heated in the flask under reduced pressure. Two fractions of distillate were collected; the first at 25 mm. and a pot temperature of 194°–210°C. which had an overhead temperature of 175°C. maximum, the second at 55 mm., pot temperature at 218°–288°C. which came at 183°–193°C. overhead temperature. The distillate fractions collected were 16 g. and 32 g., respectively. Analysis by infrared and NMR indicated both fractions to be mixtures of 3-dimethylaminopropylamine and a methacrylamide. The two fractions were then combined and distilled through a small vigreaux column. 16 g. of N-dimethylaminopropyl methacrylamide B.P. 93°–97°C. at 0.7 mm., identified by NMR analysis, was recovered along with 13 g. of 3-dimethylaminopropylamine.

EXAMPLE II

A flask equipped with a stirrer, thermometer, additon funnel and a 12-inch distillation column was charged with 500 g. 3-dimethylaminopropylamine. Over a one hour period, 172 g. methyl acrylate was added while the temperature of the mixture was allowed to rise to 70°C. The temperature was then increased to 120°C. and methanol was distilled during a 6 hour period. During this time, the reaction temperature rose to 138°C. A total of 56 g. methanol was collected.

The reaction mixture was stripped of excess dimethylaminopropylamine at 20 mm. pressure (100°C.) and then heated to 205°C. During a 1.5 hour period, 470 g. of a mixture of N-(3-dimethylaminopropyl)acrylamide and 3-dimethylaminopropylamine was collected at a head temperature of 135°–155°C. The reaction temperature during this time was 205°–275°C. The mixture of products collected was then distilled to give 225 g. N-(3-dimethylaminopropyl) acrylamide, B.P. 128°–132°C. at 4 mm. pressure. This product was identified by infrared and nuclear magnetic resonance analyses.

EXAMPLE III

To a flask equipped as described in Example I was charged a mixture of 5,000 g. 3-dimethylaminopropylamine, 2,000 g. methyl methacrylate and 2 g. N-phenyl-2-naphthylamine. The mixture was heated with stirring at 114°–147°C. for 9 hours during which 826 g. of material boiling at 65°–71°C. was distilled overhead. This overhead contained 620 g. methanol. After cooling overnight, the reaction mixture was heated to 188°C. over a 2 hour period and then the temperature was gradually increased between 188°–246°C. over 7 hours under a pressure of 25–30 mm. The vapors from the heated reaction mixture were passed through an 18-inch distillation column topped by a distillation head and a vertical condenser held at 65°C. during the reaction, then through a second inclined condenser maintained at 20°–22°C. The distillate collected before the first condenser weighed 3207 g. and was determined by GLC analysis to be 88.3% N-(3-dimethylaminopropyl)methacrylamide. The distilled fraction collected from the second condenser weighed 2,706 g. which was determined by GLC analysis to contain 16.2% of the product amide.

EXAMPLE IV 200 g. methyl methacrylate, 700 g. 4-(aminopropyl)-morpholine and 0.2 g. N-phenyl-2-napthylamine were charged to a flask equipped as described in Example I except including a reflux condenser, and the mixture was heated for 80 minutes at 148°–205°C. During this time period, 74 g. material, primarily methanol of reaction, was distilled overhead. The reaction mixture was cooled and the pressure reduced to 9 mm. The reaction mixture was then heated from 134°–235°C. over a 105 minute time period during which 341 g. material was distilled and collected at an overhead temperature of 98°–105°C. Heating was continued at 235°–270°C. for 60 minutes and an additional 416 g. material was collected at an overhead temperature of 165°–182°C. The last overhead fraction was distilled which resulted in 214 g. N-(3-morpholinopropyl)methacrylamide, B.P. 164°–168°C. at 2 mm.

EXAMPLE V

A flask, equipped as described in Example I, was charged with 50 g. methyl methacrylate, 234 g. N,N-dibutylaminoethylamine, and 0.1 g. N-phenyl-2-naphthylamine and the mixture was heated at 120°–180°C. for 3.5 hours. During this time period, 17 ml. of distillate was collected at an overhead temperature of 65°–72°C. The reaction mixture was cooled and the pressure reduced to 10 mm. The reaction mixture was then heated at 130°–265°C. for 3.25 hours during which a distilled fraction weighing 116 g. was collected at a head temperature of 715°–190°C. This last overhead fraction was distilled and 37 g. N-(2-dibutylaminoethyl) methacrylamide, B.P. 170°–175°C. at 2 mm. pressure was obtained.

EXAMPLE VI 300 g. of dimethylaminopropylamine and 100 g. of methyl methacrylate were charged to a stirred autoclave and heated at 175°–180°C. for 2 hours. The reaction mixture was then stripped free of excess dimethylaminopropylamine at a maximum final temperature of 124°C. and under a vacuum gradually reduced to 2 mm. The resulting bottoms material consisted of N-dimethylaminopropyl methacrylamide and the corresponding propionamide in a ratio of about 1:20. This reaction material was charged to a 3-neck round-bottom flask equipped with a thermometer, short column and distillation head, along with 1,000 ppm of N,N'-diphenyl phenylenediamine and heated to 230°–240°C. under reduced pressure. One fraction of distillate, 260 g., was collected at 160°–170°C. Analysis of the distillate by NMR indicated it to be a mixture of 3-dimethylaminopropylamine and the desired methacrylamide product in a ratio of about 1:1. 135 g. of N-dimethylaminopropyl methacrylamide (B.P. 95°–97°C. at 0.7 mm.) was recovered from the crude products by reduced pressure distillation.

EXAMPLE VII 610 g. of approximately a 1:20 mixture of N-dimethylaminopropyl methacrylamide and the corresponding propionamide was prepared according to the procedure described in Example VI. Over a period of 30 minutes the mixture, along with 1,000 ppm of N,N'-diphenyl phenylenediamine, was charged to a 1 liter stirring autoclave heated to a temperature of 250°C. The maximum pressure developed in the vessel was 80 psig. The reaction mixture was then processed through a wiped film evaporator where it was separated into three fractions. 125 g. of low boiling material was recovered from a cold trap and found by analysis to be about 90% pure dimethylaminopropylamine. 203 g. of crude N,N-dimethylaminopropyl methacrylamide, about 95% pure, was recovered from an overhead receiver. 284 g. of uncracked propionamide was recovered from the bottoms receiver. The crude methacrylamide was purified in the usual manner and the bottoms product was collected for recycling back to the pyrolysis reaction.

EXAMPLE VIII 4,360 g. of aminopropylmorpholine and 1,000 g. of methyl methacrylate were charged to the stirred autoclave of Example VI and heated at 175°–180°C. for 2 hours. The reaction mixture was then stripped free of excess aminopropylmorpholine at a maximum final temperature of 124°C. and under vacuum gradually reduced to 2 mm. The reaction mixture and 1,000 ppm of N,N'-diphenyl phenylenediamine were then charged to the 3-neck round-bottomed flask of Example VI and heated to 230°–240°C. 1,500 g. of N-morpholinopropyl methacrylamide (B.P. 164°–168°C., 2 mm.) were recovered from the crude product by reduced pressure distillation.

Obviously, many modifications and variations of the invention as hereinbefore set forth may be made without departing from the spirit and scope thereof, and, therefore, only such limitations should be imposed as are indicated in the claims.

We claim:

1. An improved noncatalytic process for the preparation of N-(tertiaryaminoalkyl)acrylamides of the formula

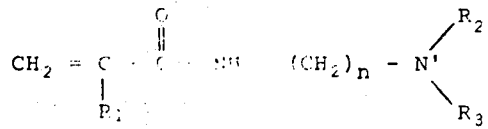

wherein $R_1$ is H or methyl; $n$ is an integer from 2 to 6; and $R_2$ and $R_3$, taken singly are lower alkyl groups containing 1 to 4 carbon atoms or $R_2$ and $R_3$, taken jointly are combined with the N' atom to form a heterocyclic group selected from the group consisting of morpholine, pyrollidine or piperidine ring groups; which process comprises:

subjecting a β-aminopropionamide of the formula

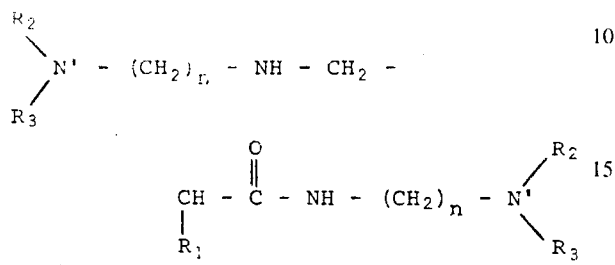

wherein $R_1$, $n$, $R_2$ and $R_3$ are same as above, to a temperature of about 180°C. to about 300°C. in the absence of a catalyst; and separating the resultant product N-(tertiaryaminoalkyl) acrylamide compound.

2. The process in accordance with Claim 1 wherein said β-aminopropionamide is obtained from mixing and reacting at least 2 moles of a tertiaryaminoalkyl amine of the formula

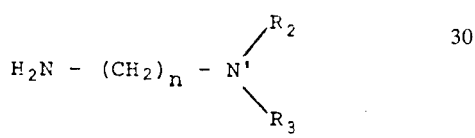

wherein $n$ is an integer from 2 to 6, $R_2$ and $R_3$, taken singly are lower alkyl groups containing 1 to 4 carbon atoms, or $R_2$ and $R_3$, taken jointly are combined with the N' atoms to form a heterocyclic group selected from the group consisting of morpholine, pyrollidine, ring groups, with an acrylic acid or ester compound of the formula

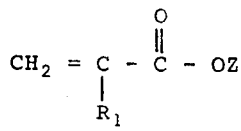

wherein $R_1$ is H or methyl and Z is H or an alkyl group containing 1 to 2 carbon atoms, at a temperature within the range of about 20°C. to about 200°C.

3. The process in accordance with claim 2 wherein said tertiaryaminoalkyl amine is selected from the group consisting of 3-dimethylaminopropylamine, 4-(aminopropyl) morpholine, N,N-dibutylaminoethylamine, N,N'-dimethylaminoethylamine, aminopropylpiperidine, and 4-(aminoethyl)morpholine.

4. The process in accordance with claim 2 wherein said tertiaryaminoalkyl amine is 3-dimethylaminopropylamine and said acrylic acid or ester compound is methyl methacrylate.

5. The process in accordance with claim 4 wherein the corresponding β-aminopropionamide is subjected to a temperature of about 210°C. to about 250°C. and a reduced pressure of about 15 mm. to about 75 mm.

6. The process in accordance with claim 1 wherein said β-aminopropionamide is subjected to said temperature in the presence of a polymerization inhibitor selected from the group consisting of hydroquinone, p-methoxyphenol, 2,6-di-t-butyl-p-cresol, N-phenyl-2-naphthylamide, N,N'-diphenyl-p-phenylenediamine, 2-mercapatobenzothiazole, or copper powder.

7. The process in accordance with claim 1 wherein the product N-(tertiaryaminoalkyl)acrylamide compound is separated from the vapors of the reaction mixture distillation.

8. An improved noncatalytic process for the continuous preparation of N-(tertiaryaminoalkyl)acrylamides of the formula

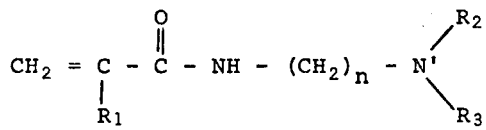

wherein $R_1$ is H or methyl; $n$ is an integer from 2 to 6; and $R_2$ and $R_3$, taken singly are lower alkyl groups containing 1 to 4 carbon atoms or $R_2$ and $R_3$, taken jointly are combined with the N' atom to form a heterocyclic group selected from the group consisting of morpholine, pyrollidine or piperidine ring groups; which continuous process comprises:

mixing and reacting at least 2 moles of tertiaryaminoalkyl amine of the formula

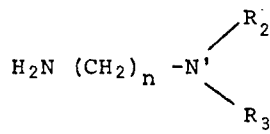

wherein $n$ is an integer from 2 to 6; $R_2$ and $R_3$, taken singly are lower alkyl groups containing 1 to 4 carbon atoms; or $R_2$ and $R_3$, taken jointly are combined with the N' atom to form a heterocyclic group selected from the group consisting of morpholine, pyrollidine, or piperidine ring groups, with an acrylic acid or ester compound of the formula

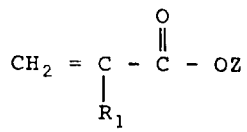

wherein $R_1$ is H or methyl and Z is H or an alkyl group containing 1 to 2 carbon atoms, at a temperature within the range of about 20°C. to about 200°C. to form a corresponding β-aminopropionamide reaction product of the formula

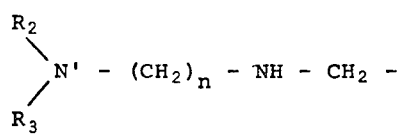

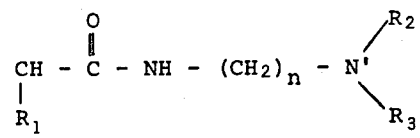

wherein $R_1$, $n$, $R_2$ and $R_3$ are same as above;

separating said corresponding β-aminopropionamide reaction product from the resultant reaction mixture;

subjecting said β-aminopropionamide reaction product to a temperature of about 180°C. to about 300°C. in the absence of a catalyst; and separating the resultant product N-(tertiaryaminoalkyl) acrylamide compound.

* * * * *